United States Patent [19]
Lee et al.

[11] 4,289,835
[45] Sep. 15, 1981

[54] LEAD ACID BATTERY HAVING CELLULAR MATRIX POSITIVE ELECTRODE

[75] Inventors: Tien S. Lee, Palatine; Anthony F. Sammells; Robert J. Remick, both of Naperville, all of Ill.

[73] Assignee: Institute of Gas Technology, Chicago, Ill.

[21] Appl. No.: 96,787

[22] Filed: Nov. 23, 1979

[51] Int. Cl.$^3$ .................................................. H01M 10/44
[52] U.S. Cl. .................................................. 429/50; 429/228
[58] Field of Search .................................... 429/225–228, 429/50

[56] References Cited

U.S. PATENT DOCUMENTS

| | | | |
|---|---|---|---|
| 3,490,954 | 1/1970 | Babrisu et al. | 429/225 X |
| 3,765,942 | 10/1973 | Jache | 429/225 X |
| 4,130,695 | 12/1978 | Dietz et al. | 429/225 X |
| 4,148,978 | 4/1979 | Winsel et al. | 429/225 X |
| 4,160,068 | 7/1979 | Kummer | 429/82 |

Primary Examiner—Charles F. LeFevour
Attorney, Agent, or Firm—Thomas W. Speckman

[57] ABSTRACT

A lead-acid battery having a positive electrode with an electrically conducting current collector bus plate, a honeycomb matrix structure extending from at least one side of the bus plate forming multiple positive active material compartments and an acid ion porous retainer means adjacent the open ends of the material compartments, the compartments containing positive active material having lead oxide reactive material and an electronic conductive additive within an acid ion porous structure. The electronic conductive additive increases the electronic flow from the reaction site in the positive active material to the current collector bus plate. This invention provides an improved positive active material with an electronic conductive additive. The positive active material, positive electrodes and lead-acid batteries of this invention provide high energy densities and high cycle lives suitable for use in electric vehicles.

40 Claims, 3 Drawing Figures

LEAD ACID BATTERY HAVING CELLULAR MATRIX POSITIVE ELECTRODE

BACKGROUND OF THE INVENTION

1. Field of the Invention

This invention relates to a lightweight lead-acid battery and process delivering high energy densities and high cycle lives suitable for use in electric vehicles. Increasing energy prices and increasing unavailability of hydrocarbon fuels enhance the interest and feasibility of small electric cars. Electric vehicles powered by batteries having energy densities as low as about 20 to 25 W-hr/lb would be satisfactory, provided the batteries have acceptable cycle lifetimes. Lead-acid batteries of the 1920's were capable of delivering energy densities of about 10 W-hr/lb while present day lead batteries in similar applications routinely deliver about 15 W-hr/lb. The theoretical energy density of a lead-acid battery is close to 80 W-hr/lb. Attempts have been made to effect weight reduction in the grids and current collectors, as well as to increase the utilization of active material in the lead-acid batteries.

2. Description of the Prior Art

Lead-acid batteries have been in use for over 100 years with continued efforts toward their improvement. The standard SLI lead rectilinear grid, as described in "Lead-Acid Batteries", H. Bode, New York: John Wiley, 1977, is not suitable for use in electric vehicle batteries due to its high weight and low practical cycle life at high depths of discharge. There have been attempts to replace these lead-alloy grids with lighter metals while making good electrical contact with the positive active material by surface oxide layers as taught by U.S. Pat. No. 4,037,031 and through use of graphite impregnated plastics such as taught by U.S. Pat. No. 4,001,037. There have also been various attempts to prevent shedding of the positive active material, such as encapsulation of the active material within the grid assembly as proposed by U.S. Pat. No. 4,037,030. There have also been proposals to overlay a standard rectilinear lead-alloy grid with plastic net of polyolefin as more fully described by A. Faber, "A New Metal/Plastic Compound-Electrode for Traction Batteries", paper presented at the 11th International Power Sources Symposium, Brighton, Sussex, England, September 1978.

The configurations of the positive electrodes of prior lead-acid batteries utilizing plate-type or tubular-type type structures as more fully taught by "Lead-Acid Batteries", A Reference and Data Book, compiled by the Indian Lead Zinc Information Centre, Elsevier Sequoia S.A., Lausanne, 1977, and "Storage Batteries", G. W. Vinal, John Wiley, New York, 1955, provide limited contact between the positive active material and the current collector. The present invention, through its use of a conductive additive in the positive active material, together with its preferred positive electrode structure, provides greater utilization of the positive active material and facilitates transport between the lead oxide and the current collector. The present invention provides greater utilization of the positive active material than conventional lead oxide pastes as more fully disclosed in "Lead-Acid Batteries", H. Bode, supra.

SUMMARY OF THE INVENTION

This invention provides an improved lead-acid battery comprising a container having one or more negative electrodes, positive electrodes, cell separators therebetween and an acid electrolyte therein. The positive electrode comprises an electrically conducting current collector bus plate with a honeycomb matrix structure extending from one side of the collector bus plate forming multiple positive active material compartments. The honeycomb matrix has electrically conducting surfaces in electrical communication with the collector bus plate. An acid ion porous retainer means is provided adjacent the open ends of the material compartments and in contact with the acid electrolyte. The compartments having enclosed sides of the honeycomb matrix with one end closed by the current collector bus plate and the opposite end closed by the acid ion porous retainer means contains a positive active lead oxide material. The positive active material comprises lead oxide reactive material and an electronic conductive additive within an acid ion porous structure. The acid ions of the electrolyte contact the lead oxide for reaction to produce electronic flow whose conductance to the honeycomb matrix structure and the current collector bus plate is increased by the conductive additive.

The process for obtaining high rate discharge from a lead-acid battery of this invention comprises passing acid ions through the acid ion porous retainer means and reacting the acid ions with lead oxide to produce electronic flow. The conductance of the electronic flow so produced through the acid ion porous structure to the electrically conducting surface of the honeycomb matrix or the current collector bus plate is increased by a conductive additive within the porous structure. The electronic flow is conducted through the honeycomb matrix to the current collector bus plate and withdrawn from the current collector bus plate to produce the high rate discharge.

It is an object of this invention to provide a lead-acid battery and process having greater delivered energy density than presently available lead-acid batteries.

It is another object of this invention to provide a lead-acid battery and process having greater cycle life than presently available lead-acid batteries.

It is yet another object of this invention to provide a lightweight lead-acid battery and process delivering high energy densities and providing high cycle lives suitable for electrical vehicle batteries.

It is still another object of this invention to provide a lead-acid battery positive electrode having improved Faradaic utilization and increased cycle life.

It is another object of this invention to provide a lead-acid battery positive electrode having reduced shedding.

It is yet another object of this invention to provide a lead-acid battery positive electrode having reduced weight.

It is another object of this invention to provide a positive active material having greater electronic conductivity between the lead oxide and the current collector.

BRIEF DESCRIPTION OF THE DRAWING

These and other objects and advantages of the invention will be apparent from further reading of this disclosure and reference to the drawings showing preferred embodiments wherein.

DESCRIPTION OF THE PREFERRED EMBODIMENTS

Figure 1:
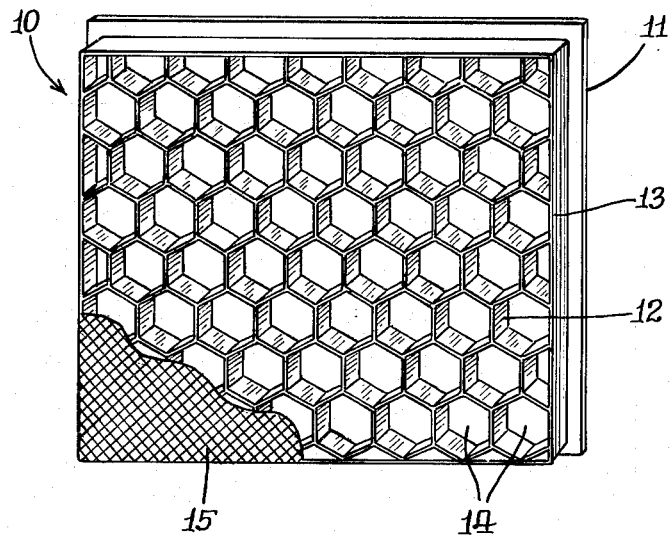
FIG. 1 is a diagrammatic perspective partially sectioned view of a positive electrode according to one embodiment of this invention.
Figure 2:
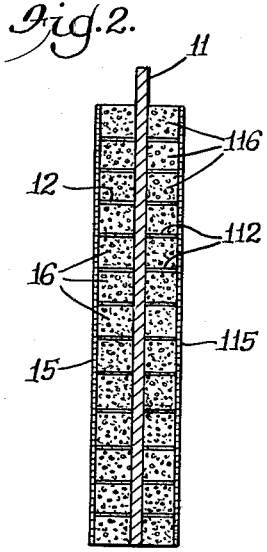
FIG. 2 is a sectional diagrammatic view of another embodiment of a positive electrode according to this invention.

Referring to the figures, particularly FIGS. 1 and 2, a positive electrode for use in a lead-acid battery according to this invention is shown generally as 10. The positive electrode has electrically conducting current collector bus plate 11 with honeycomb matrix structure 12 extending from one side forming, together with matrix side closure 13, positive active material compartments 14. The honeycomb matrix structure 12 and preferably matrix side closure 13 have electrically conducting surfaces in electrical communication with current collector bus plate 11. Acid ion porous retainer means 15 is adjacent the open ends of the material compartments and in contact with the acid electrolyte.

Honeycomb matrix structure 12 extending from one side of collector bus plate 11 and the acid ion porous retainer means 15 form separate compartments in the positive electrode for containment of positive active material. The acid ion porous retainer means 15 allows ready contact between the acid ion and particles containing lead oxide in the positive active material for reaction to produce electronic flow. The electronic flow so produced is conducted to the honeycomb matrix structure and the current collector bus plate with the aid of a conductive additive in the positive active material porous structure. The compartmentalization of the positive active material in compartments bounded by electrically conducting surfaces reduces the distance of electronic flow through the positive active material to reach a more efficient electrical conductor. The electronic flow is conducted by the honeycomb matrix structure to the current collector bus plate which is a more efficient electrical conductor than the positive active material. The positive active material within the compartments comprises discrete particles of lead oxide reactive compound for reaction with the acid ions. An electronic conductive additive is added to an acid ion porous structure of the positive active material to increase the electrical conductivity of the positive active material.

FIG. 2 shows a positive electrode according to another embodiment of this invention wherein current collector bus 11 has honeycomb matrix structure 12 extending from one side and a similar honeycomb matrix structure 112 extending from the opposite side. Positive active material 16 is shown within matrix structure 12 and retained within the compartments by retainer means 15 which is porous to and in contact with the electrolyte containing acid ions. Likewise, honeycomb matrix structure 112 extends from the opposite side of current collector bus 11 and forms compartments containing positive active material 116 retained in the compartments by retainer means 115 which is porous to and in contact with the electrolyte containing acid ions.

The current collector bus of the positive electrode of this invention provides for electronic transfer at high current densities, provides lightweight mechanical support for the electrode structure and provides stability with respect to corrosion resistance by the electrolyte.

The current collector buses of this invention may advantageously be fabricated from metals which are lighter and more electrically conductive than lead and may have any suitable coating to increase their resistance to corrosion by the electrolyte. For example, the current collector bus may be fabricated from iron or aluminum with boronized surface coating or with electronic conducting ceramic coatings.

Suitable methods for providing a boronized surface to a metallic substrate, particularly a low carbon ferrous substrate, are known to the art. The methods for preparing boride coatings, called boronizing or boriding, may generally be divided into four categories: gas boronizing by flowing a chemically active boron-containing gas over a substrate; immersion in a boron-containing molten-salt bath; electrolysis in a boron-containing molten-salt bath; and pack boronization, immersing the substrate into a boron-containing material, a filler and an activating material capable of producing a volatile, boron-containing compound. Canadian Pat. No. 1,001,532 teaches suitable methods for boriding. Thick iron boride coatings can be easily prepared and thicknesses of several hundred micrometers are common. Low carbon steels are the most easily boronized ferrous metals and show a characteristic dentate structure having depths in the order of 0.05 to 0.20 mm using packed boronization techniques. Low carbon steels such as AISI 1008 and 1018 steels are suitable. Alloying retards boronization and creates a smooth boundary between the coating and the ferrous substrate, unlike the characteristic dentate structure observed with the boride coatings on low carbon steels.

The current collector bus of the positive electrode of this invention may also be lead or a lead alloy as used in the past for positive electrode current collectors.

The honeycomb matrix structure may be fabricated from an electrically conducting metal, or due to the lesser current densities required may be fabricated from a synthetic polymer plastic coated with an electrically conducting coating or filled with an electrically conducting additive. While the figures show the honeycomb structure to be made up of hexagons, other polygon, circular or oval shapes are suitable and are included within the meaning of the terminology "honeycomb" as used in this disclosure and claims. The honeycomb matrix structure provides more efficient electrical conductance than the positive active material and provides compartments for physically retaining the positive active material to prevent problems of shedding experienced with prior positive electrodes. The honeycomb structure, with each compartment containing a relatively small amount of the positive active material, provides a more uniform distribution of forces caused by expansion and contraction of positive active material during cycling. The size of the compartments formed by the honeycomb structure can be varied to maximize the desired current flow upon considerations of the electrical conductance of the positive active material and of the honeycomb structure. Generally, the size of the honeycomb compartments will be in the order of 0.05 to 1.2 cm$^3$.

The acid ion porous retainer means principally serves to contain the positive active material and to provide free access of the electrolyte acid ions to the positive active material. Preferably the acid ion porous retainer means is electrically conducting. The acid porous retainer means may be fabricated from a lightweight metal screening which is stable in the lead acid environment. Iron or aluminum screening with boronized surfaces are suitable. The acid ion porous retainer means may also be a non-electrically conducting material such as fiber felt or conventional separator materials such as nitrocellulose, cellulose acetate, or other fluorocarbon ion exchange membranes.

The positive active material comprises a major amount of discrete particles of lead oxide or conventional lead oxide paste and minor amounts by weight of an electronic conductive additive within an acid ion porous structure. By major amount, we mean greater than 50 weight percent and preferably greater than 70 weight percent. The acid ions of the electrolyte contact the lead oxide for reaction to produce electronic flow whose conductance to the current collector bus plate is increased by the conductive additive. The electronically conducting additives must be stable under the corrosive conditions present in the lead acid battery. Any material providing desired conductivity and resistance to electrolyte corrosion may be used, such as those selected from the group consisting of $TaB_2$, $FeB$, $TaN$, $ZrSi_2$, $NbSi_2$, $TiP$, $CrP$ and mixtures thereof. The acid ion porous structure of the positive active material may be formed from a stable synthetic polymer, such as polyethylene, polytetrafluoroethylene, Dyflor and Kynar. The positive active material may be formulated by mixing powders of about 1 to 15 (preferably about 7 to 13) weight percent synthetic polymer, such as polyethylene, about 1 to 15 (preferably about 7 to 13) weight percent electronic conductive additive as disclosed above, with the remainder being lead oxide. The mixture can be cold pressed to the desired shape and heated to the softening point of the plastic. The positive active material may also be formulated by melting the plastic and adding the electronic conductor to the molten plastic in the proportion of about 25 to 75 weight percent electronic conductor, solidify the plastic and pulverize the solidified plastic to a powder. The pulverized conducting plastic may then be mixed with powdered lead oxide in proportions of 1 to 30 weight percent conducting plastic and the resulting mixture may be pressed or extruded to desired shapes. The positive active material may be loaded into the honeycomb compartments as a loose aggregate of solid materials forming an acid ion porous structure. The positive active material may also be used in the form of a lead oxide paste with an electronic conductor additive as described above.

Having the positive active material in the form disclosed by this invention reduces shedding to a very low level due largely to enclosing the positive active material in the honeycomb structure. Further, the intimacy of the active lead containing material—acid ion—electronic conductive additive increases the active material utilization and efficiency. The acid ion porous structure, being electrochemically inactive, reduces morphological changes upon repeated cycling of the cell and acts as a permanent template upon which the lead oxide crystals can nucleate.

Figure 3:
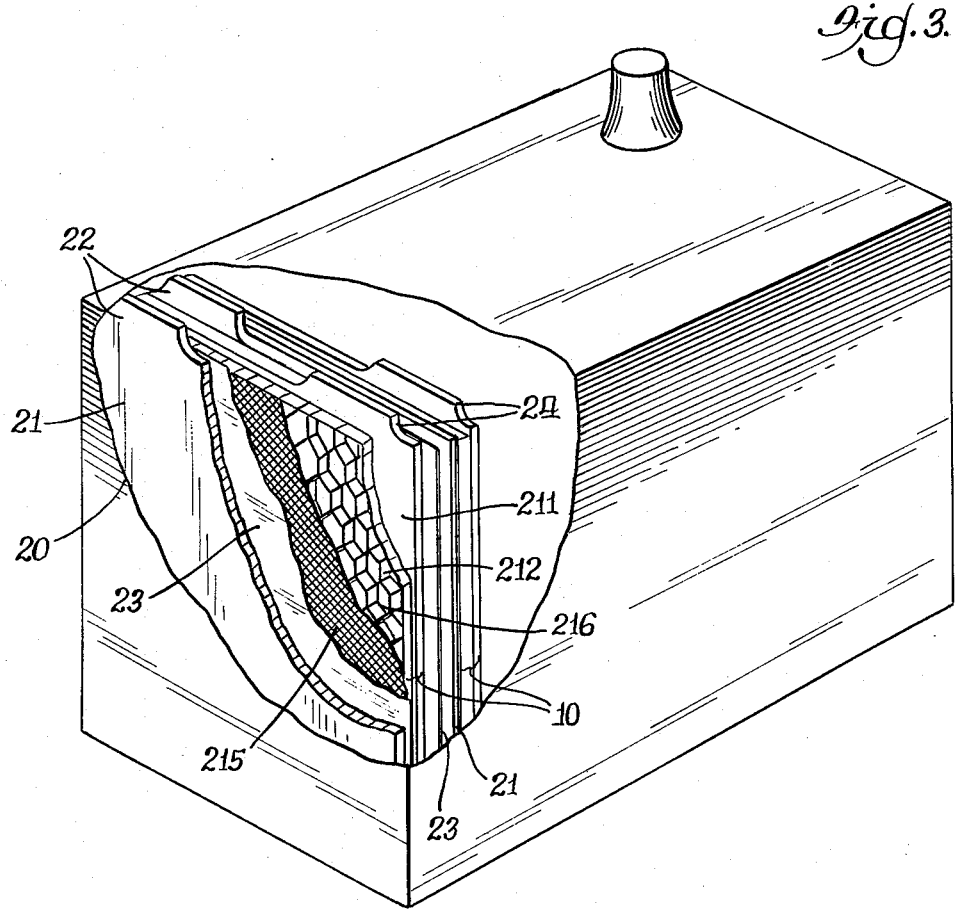
FIG. 3 is a perspective partially cutaway view of a lead-acid battery according to one embodiment of this invention.

FIG. 3 shows a positive electrode according to this invention in a lead acid battery comprising generally container 20 having one or more negative electrodes 21 with negative current collector tab 22, cell separators 23, positive electrodes 10 and an acid electrolyte therein. Positive electrode 10 is made up of current collector bus plate 211, honeycomb matrix structure 212, retainer means 215 and positive active material 216. Any electrode configuration and any lead-acid battery configuration and materials, such as case materials and electrolytes, known to the art are suitable for use with the positive electrode according to this invention. For battery use, it is preferred that the configuration having honeycomb matrix on opposite sides of the current collector bus plate be used, as shown in FIG. 2. Exemplary of the current state of the art in lead acid batteries is set forth in "Lead-Acid Batteries", H. Bode, (supra), "Lead-Acid Batteries" A Reference and Data Book, (supra) and "Storage Batteries," Vinal (supra).

According to this invention, through the use of lightweight materials, the weight of current collectors can be reduced by about 50%. Incorporation of an electronic conductor into the positive active material increases the active material utilization at the C/3 rate by about 50 percent without increasing the weight of the active mass by more than about 30 percent due to addition of an electronic conductor. Under such conditions, a deliverable energy density from the lead acid battery of this invention can be about 27 W-hr/lb (60 W-hr/kg).

The following specific example is set forth for the purpose of illustration and should not limit this invention in any way:

EXAMPLE

Positive active material is made from an electronically conducting binder which consists of 8 weight percent, based upon total positive active material, polyethylene and 10 weight percent, based upon total positive active material, of finely dispersed FeB and active lead oxide 82 weight percent, based upon total positive active material, consisting of ball-milled lead oxide with a stoichiometry having a 30 percent excess of lead and an apparent density of 1.15 g/cm$^3$.

These two components are intimately mixed together, pressed at 1500 psi into a sheet and sintered at 200° C. for 10 minutes. The final sheet 1 mm thick is pelletized by a perforation process. These pelletized particles are introduced into a polyethylene honeycomb matrix cell compartment on one side of a boronized ion current collector bus plate as shown in FIG. 1. A finely dispersed FeB powder 7-10 weight percent, is introduced into the polyethylene prior to its fabrication by injection molding. The positive active material is contained within the honeycomb matrix cell compartment by placing an acid ion porous retainer of Duramic over the open end of the compartments by heat sealing to open ends of the cells of the honeycomb matrix. This positive electrode is then introduced into a battery assembly as shown in FIG. 3.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A lead-acid battery comprising: a container having one or more negative electrodes, positive electrodes, cell separators therebetween and an acid electrolyte therein, each of said positive electrodes comprising: an electrically conducting current collector bus plate; a honeycomb matrix structure extending from one side of said collector bus plate forming multiple positive active material compartments and having electrically conducting surfaces in electrical communication with said collector bus plate; and acid ion porous retainer means adjacent the ends of said material compartments opposite said collector bus plate and in contact with said acid electrolyte; and positive active material within said compartments and in electrical communication with said collector bus plate and said honeycomb matrix electrically conducting surfaces, said positive active material comprising lead oxide reactive material and powdered electronic conductive additive resistive to electrolyte corrosion throughout a stable acid ion porous structure, the acid ions of the electrolyte passing through said retainer means and contacting said reactive material to produce electronic flow whose conductance to said honeycomb matrix structure and said current collector bus plate is increased by said conductive additive.

2. The lead-acid battery of claim 1 wherein said current collector bus plate is an electrically conducting metal.

3. The lead-acid battery of claim 1 wherein said honeycomb matrix structure is electrically conducting metal.

4. The lead-acid battery of claim 1 wherein said honeycomb matrix structure is synthetic polymer plastic coated or filled with an electrically conducting coating.

5. The lead-acid battery of claim 1 wherein said honeycomb matrix structure extends from both sides of said collector bus plate.

6. The lead-acid battery of claim 1 wherein said acid ion porous retainer means is an electrically conductive screen.

7. The lead-acid battery of claim 1 wherein said acid ion porous retainer means is a fiber felt.

8. The lead-acid battery of claim 1 wherein said electronic conductive additive is selected from the group consisting of $TaB_2$, FeB, TaN, $ZrSi_2$, $NbSi_2$, TiP, CrP and mixtures thereof.

9. The lead-acid battery of claim 1 wherein said acid ion porous structure is a stable synthetic polymer.

10. The lead-acid battery of claim 9 wherein said synthetic polymer is selected from the group consisting of polyethylene, polytetrafluoroethylene, Dyflor and Kynor.

11. The lead-acid battery of claim 1 wherein said lead oxide is in the form of a paste.

12. The lead-acid battery of claim 1 wherein said lead oxide is in the form of discrete particles.

13. The lead-acid battery of claim 1 wherein said positive active material comprises about 1 to 15 weight percent acid porous structure, about 1 to 15 weight percent electronic conductive additive and the remainder being lead oxide.

14. In a lead-acid electrolyte battery, an improved positive electrode comprising: an electrically conducting current collector bus plate; a honeycomb matrix structure extending from one side of said collector bus plate forming multiple positive active material compartments and having electrically conducting surfaces in electrical communication with said collector bus plate; an acid ion porous retainer means adjacent the ends of said material compartments opposite said collector bus plate and in contact with said acid electrolyte; and positive active material within said compartments and in electrical communication with said collector bus plate and said honeycomb matrix electrically conducting surfaces, said positive active material comprising lead oxide reactive material and powdered electronic conductive additive resistive to electrolyte corrosion throughout a stable acid ion porous structure, the acid ions of the electrolyte passing through said retainer means and contacting said reactive material to produce electronic flow whose conductance to said honeycomb matrix structure and said current collector bus plate is increased by said conductive additive.

15. In a lead-acid battery, the improved positive electrode of claim 14 wherein said current collector bus plate is an electrically conducting metal.

16. In a lead-acid battery, the improved positive electrode of claim 14 wherein said honeycomb matrix structure is electrically conducting metal.

17. In a lead-acid battery, the improved positive electrode of claim 14 wherein said honeycomb matrix structure is synthetic polymer plastic coated or filled with an electrically conducting coating.

18. In a lead-acid battery, the improved positive electrode of claim 14 wherein said honeycomb matrix structure extends from both sides of said collector bus plate.

19. In a lead-acid battery, the improved positive electrode of claim 14 wherein said acid ion porous retainer means is an electrically conductive screen.

20. In a lead-acid battery, the improved positive electrode of claim 14 wherein said acid ion porous retainer means is a fiber felt.

21. In a lead-acid battery, the improved positive electrode of claim 14 wherein said electronic conductive additive is selected from the group consisting of $TaB_2$, FeB, TaN, $ZrSi_2$, $NbSi_2$, TiP, CrP and mixtures thereof.

22. In a lead-acid battery, the improved positive electrode of claim 14 wherein said acid ion porous structure is a synthetic polymer.

23. In a lead-acid battery, the improved positive electrode of claim 22 wherein said synthetic polymer is selected from the group consisting of polyethylene, polytetrafluoroethylene, Dyflor and Kynor.

24. In a lead-acid battery, the improved positive electrode of claim 14 wherein said lead oxide is in the form of a paste.

25. In a lead-acid battery, the improved positive electrode of claim 14 wherein said lead oxide is in the form of discrete particles.

26. In a lead-acid battery, the improved positive electrode of claim 14 wherein said positive active material comprises about 1 to about 15 weight percent acid porous structure, about 1 to 15 weight percent electronic conductive additive and the remainder being lead oxide.

27. A process for obtaining high rate discharge from a lead-acid battery comprising: passing acid ions of an acid electrolyte through an acid ion porous retainer means to contact positive active material; reacting said acid ions with said positive active material comprising lead oxide thereby producing electronic flow; increasing the conductance of said electronic flow through said positive active material to an electrically conducting surface of a honeycomb matrix structure positive active material retention compartment and to an electrically conducting current collector bus plate by a powdered conductive additive throughout said positive active material within a stable acid ion porous structure; conducting said electronic flow through said honeycomb matrix structure to said current collector bus plate, and withdrawing said electronic flow from said current collector bus plate to produce high rate discharge.

28. The process of claim 27 wherein said current collector bus plate is an electrically conducting metal.

29. The process of claim 27 wherein said honeycomb matrix structure is electrically conducting material.

30. The process of claim 27 wherein said honeycomb matrix structure is synthetic polymer plastic coated or filled with an electrically conducting coating.

31. The process of claim 27 wherein said honeycomb matrix structure extends from both sides of said collector bus plate.

32. The process of claim 27 wherein said acid ion porous retainer means is an electrically conductive screen.

33. The process of claim 27 wherein said acid ion porous retainer means is a fiber felt.

34. The process of claim 27 wherein said electronic conductive additive is selected from the group consisting of $TaB_2$, $FeB$, $TaN$, $ZrSi_2$, $NbSi_2$, $TiP$, $CrP$ and mixtures thereof.

35. The process of claim 27 wherein said acid ion porous structure is a stable synthetic polymer.

36. The process of claim 27 wherein said synthetic polymer is selected from the group consisting of polyethylene, polytetrafluoroethylene, Dyflor and Kynar.

37. The process of claim 27 wherein said lead oxide is in the form of a paste.

38. The process of claim 27 wherein said lead oxide is in the form of discrete particles.

39. The process of claim 27 wherein said positive active material comprises about 1 to 15 weight percent acid porous structure, about 1 to 15 weight percent electronic conductive additive and the remainder being lead oxide.

40. The process of claim 39 wherein said acid porous structure comprises about 7 to 13 weight percent and said electronic conductive additive comprises about 7 to 13 weight percent.

* * * * *